(12) United States Patent
Päivinen

(10) Patent No.: US 10,655,318 B2
(45) Date of Patent: May 19, 2020

(54) STORMWATER DRAIN BAFFLE

(71) Applicant: Uponor Infra Oy, Vantaa (FI)

(72) Inventor: Niko Päivinen, Lahti (FI)

(73) Assignee: UPONOR INFRA OY, Vantaa (FI)

( * ) Notice: Subject to any disclaimer, the term of this patent is extended or adjusted under 35 U.S.C. 154(b) by 0 days.

(21) Appl. No.: 16/093,805

(22) PCT Filed: Apr. 19, 2017

(86) PCT No.: PCT/FI2017/050293
§ 371 (c)(1),
(2) Date: Oct. 15, 2018

(87) PCT Pub. No.: WO2017/182711
PCT Pub. Date: Oct. 26, 2017

(65) Prior Publication Data
US 2019/0078311 A1   Mar. 14, 2019

(30) Foreign Application Priority Data

Apr. 20, 2016   (FI) .................................. 20165345

(51) Int. Cl.
*E03F 5/14* (2006.01)
*B01D 21/00* (2006.01)
(Continued)

(52) U.S. Cl.
CPC ............ *E03F 5/14* (2013.01); *B01D 21/0003* (2013.01); *B01D 21/0033* (2013.01);
(Continued)

(58) Field of Classification Search
CPC ...... E03F 5/0403; E03F 5/14; B01D 21/0003; B01D 21/0033; B01D 21/0039
(Continued)

(56) References Cited

U.S. PATENT DOCUMENTS 4,157,969 A * 6/1979 Thies ................. B01D 17/0208
210/521
4,689,145 A * 8/1987 Mathews .................. E03F 5/14
210/170.03

(Continued)

FOREIGN PATENT DOCUMENTS

| JP | 2006-29047 | * | 2/2006 |
| KR | 10-2011-0030841 | * | 3/2011 |
| KR | 10-1147214 | * | 5/2012 |

*Primary Examiner* — Christopher Upton
(74) *Attorney, Agent, or Firm* — Occhiuti & Rohlicek LLP

(57) ABSTRACT

A stormwater drain baffle to be disposed in a flow-through stormwater sump or chamber for baffling a stormwater flow-path. The baffle has a plurality of openings distributed over the area of the baffle. The baffle comprises at least two baffle portions connected to each other. The baffle portions are disposed near to and in superposed relation to each other, so that the baffle portions overlap each other and are adjustably connected to each other for adjusting the width ($W_{tot}$) of the baffle. At least the outermost baffle portions of the baffle comprise fixing members which are monolithic with the baffle portion and adapted for fixing the baffle to the vertical inner wall of the sump or the chamber.

25 Claims, 5 Drawing Sheets

(51) Int. Cl.
*E03F 5/10* (2006.01)
*E03F 5/04* (2006.01)

(52) U.S. Cl.
CPC ............ *E03F 5/0403* (2013.01); *E03F 5/106* (2013.01); *B01D 2221/12* (2013.01)

(58) Field of Classification Search
USPC .............. 210/162, 170.03, 521, 532.1, 747.2
See application file for complete search history.

(56) References Cited

U.S. PATENT DOCUMENTS

| | | | |
|---|---|---|---|
| 5,405,539 A | 4/1995 | Schneider | |
| 5,505,860 A | 4/1996 | Sager | |
| 6,783,009 B1 * | 8/2004 | Meurer | G05D 7/0186 210/521 |
| 7,722,763 B2 * | 5/2010 | Benty | B01D 21/0012 210/170.03 |
| 8,017,004 B2 * | 9/2011 | Crumpler | E03F 5/0404 210/170.03 |
| 8,663,466 B2 | 3/2014 | Braunwarth et al. | |
| 8,715,507 B2 | 5/2014 | Gulliver et al. | |
| 9,752,600 B2 * | 9/2017 | Hoff | E03F 5/0403 |
| 10,132,071 B1 * | 11/2018 | Alvarado | E03F 5/14 |
| 2012/0255622 A1 | 10/2012 | Braunwarth et al. | |

\* cited by examiner

STORMWATER DRAIN BAFFLE

CROSS-REFERENCE TO RELATED APPLICATIONS

This application is the National Stage under 35 USC 371 of International Application No. PCT/FI2017/050293, filed on Apr. 19, 2017, which claims the priority of Finnish Application No. 20165345, filed on Apr. 20, 2016. The contents of both applications are hereby incorporated by reference in their entirety.

FIELD OF THE INVENTION

The present invention relates to a stormwater drain baffle to be disposed in a flow-through stormwater sump or chamber for baffling a stormwater flow-path. The baffle has a plurality of openings distributed over the area of the baffle. The baffle comprises at least two baffle portions connected to each other.

BACKGROUND OF THE INVENTION

Stormwater drainage system is designed to drain excess rain and ground water from impervious surfaces such as paved streets, car parks, parking lots, footpaths, sidewalks, and roofs. Stormwater drains vary in design from small residential dry wells to large municipal systems. Many stormwater drainage systems are designed to drain the untreated stormwater containing pollutants into sea, lakes or rivers. In the stormwater drainage system, stormwater is collected to a flow-through stormwater sump or well. The stormwater sump is generally a concrete cylinder having an inlet pipe and an outlet pipe located at distance from the bottom of the sump. The particles suspended in stormwater are supposed to settle as a sediment layer on the bottom of the sump. Under low flow conditions sump is able to remove suspended sediment, but under high flow conditions the sump is unable to retain the particles when the water enters the sump at high flow rate. Then the sump becomes filled with water and the incoming high rate flow creates an undesirable circular flow pattern inside the sump which causes resuspension and wash out of the sediment from the bottom to the outlet pipe. In prior art, documents U.S. Pat. Nos. 8,715,507, 8,663,466 and US 2012/0255622 have proposed to retrofit the sump with a baffle. The baffle has proved to be efficient to reduce the undesirable wash out of the sediment. U.S. Pat. No. 8,663,466 and US 2012/0255622 disclose stormwater drain baffles having a plurality of openings distributed over the area of the baffle. The baffle comprises at least two baffle portions connected to each other. The baffle portions are attached to a support frame structure which is rather complicated having many different parts.

OBJECTIVE OF THE INVENTION

It is an objective of the present invention to provide an improved stormwater drain baffle with a simple and stiff structure and which easily can be adjusted to a variety of different diameters of sumps.

It is also an objective of the present invention to provide a baffle which has integrated stiffening and fixing elements and provides to be attachable to the sidewall of the sump or chamber.

SUMMARY OF THE INVENTION

According to an aspect of the present invention, it provides a stormwater drain baffle to be disposed in a flow-through stormwater sump or chamber for baffling a stormwater flow-path, the baffle having a plurality of openings distributed over the area of the baffle, the baffle comprising at least two baffle portions connected to each other. According to the invention the baffle portions are disposed near to and in superposed relation to each other so that the baffle portions overlap each other and are adjustably connected to each other for adjusting the width of the baffle. At least the outermost baffle portions of the baffle comprise fixing members which are monolithic with the baffle portion and adapted for fixing the baffle to the vertical inner wall of the sump or the chamber.

The technical effect of the invention is that the structure of the baffle is simple having a few parts and the baffle width can easily be adjusted to fit to sumps with different diameters for fixing to the sidewall of the sump.

In one embodiment of the baffle, the fixing members comprise a fixing flange having at least one bolt hole for a first bolted joint.

In one embodiment of the baffle, the baffle portions are substantially planar.

In one embodiment of the baffle, the baffle portion comprises edges and stiffening members, and that the stiffening members are disposed at the edges.

In one embodiment of the baffle, the baffle portions are rectangular in shape.

In one embodiment of the baffle, the stiffening members are disposed at least at two edges of a rectangular baffle portion.

In one embodiment of the baffle, the stiffening members are disposed at all four edges of each rectangular baffle portion.

In one embodiment of the baffle, the stiffening members are stiffening flanges which are monolithic with the baffle portion.

In one embodiment of the baffle, the stiffening members are stiffening flanges which are bent at an angle in relation to the plane of the baffle portion.

In one embodiment of the baffle, the stiffening flanges are bent at right angle in relation to the plane of the baffle portion.

In one embodiment of the baffle, the fixing flange is a stiffening flange.

In one embodiment of the baffle, the baffle portion has a width which is smaller than the diameter of the manhole opening of the stormwater sump into which the baffle is to be installed.

In one embodiment of the baffle, the width of the baffle portion is smaller than 600 mm.

In one embodiment of the baffle, the baffle comprises a rectangular first baffle portion and a rectangular second baffle portion.

In one embodiment of the baffle, the first baffle portion and the second baffle portion have a first side and a second side, and the second side is the opposite side in relation to the first side.

In one embodiment of the baffle, the vertical fixing flange of the first baffle portion is directed towards the first side and the vertical fixing flange of the second baffle portion is directed to the second side.

In one embodiment of the baffle, the stiffening flange of the first baffle portion, which is disposed at the edge that is parallel in relation to the vertical fixing flange of the first baffle portion, is directed to the second side.

In one embodiment of the baffle, the stiffening flange of the second baffle portion, which is disposed at the edge that is parallel in relation to the vertical fixing flange of the second baffle portion, is directed to the first side.

In one embodiment of the baffle, the stiffening flange, which is at the horizontal lower edge of the first baffle portion, is directed to the first side.

In one embodiment of the baffle, the stiffening flange, which is at the horizontal lower edge of the second baffle portion, is directed to the first side.

In one embodiment of the baffle, the stiffening flange, which is at the horizontal upper edge of the first baffle portion, is directed to the first side.

In one embodiment of the baffle, the stiffening flange, which is at the horizontal upper edge of the second baffle portion, is directed to the first side.

In one embodiment of the baffle, the baffle portions are connected to each other by second bolted joints.

In one embodiment of the baffle, the baffle portions are made of plastics.

In one embodiment of the baffle, the baffle portions have a wall thickness of 5 to 15 mm.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
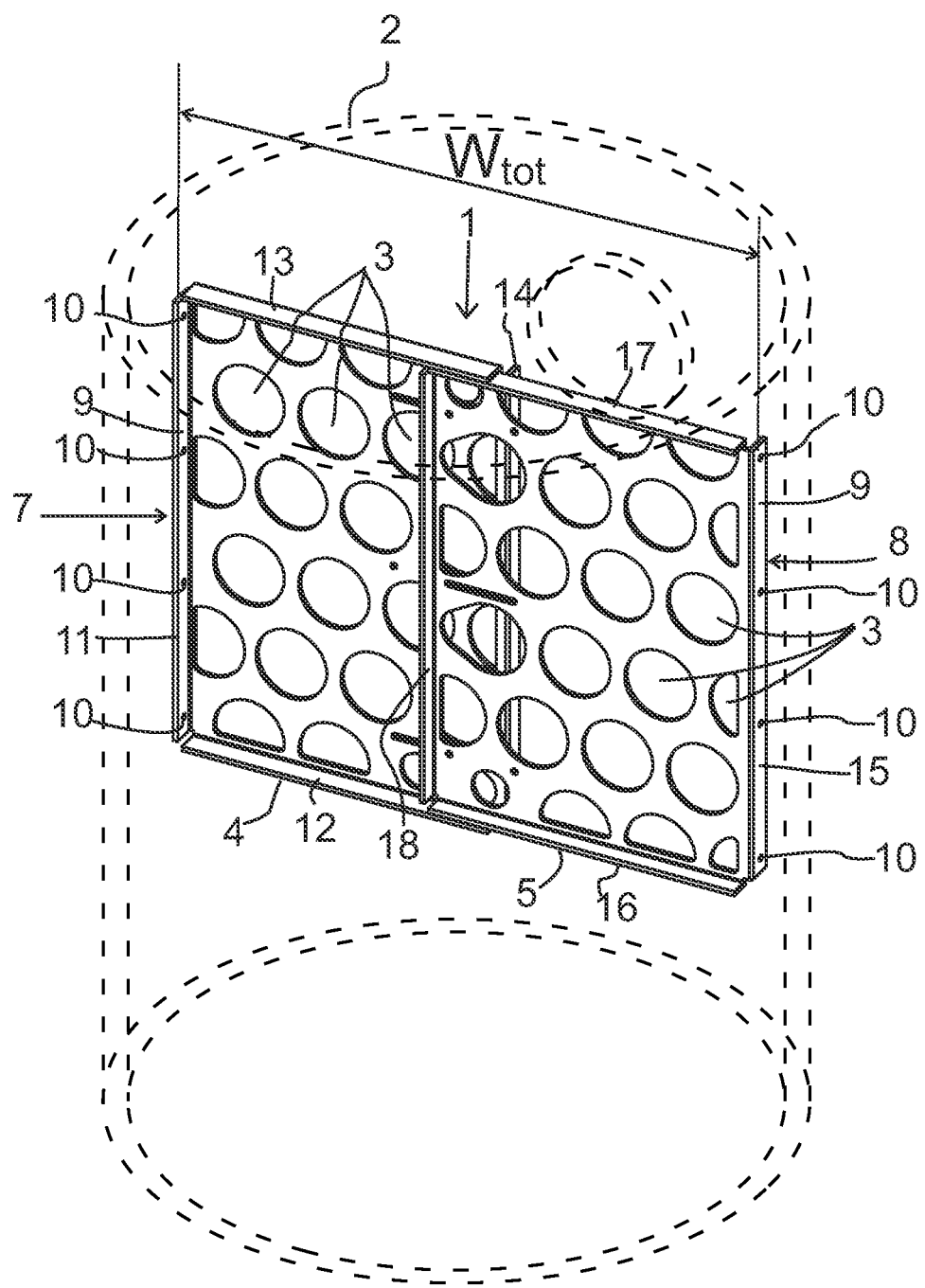
FIG. 1 is an axonometric view of a stormwater drain baffle according to one embodiment of the invention the baffle being shown as installed in a stormwater sump.
Figure 4:
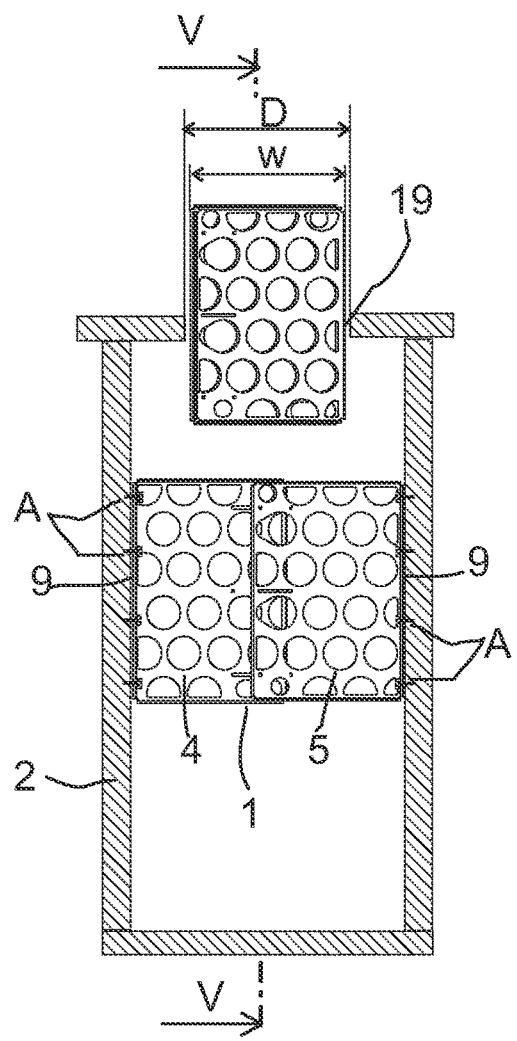
FIG. 4 shows a cross-section of a stormwater sump wherein the baffle is installed, and demonstrating insertion of the baffle portions via the manhole into the sump.
Figure 5:
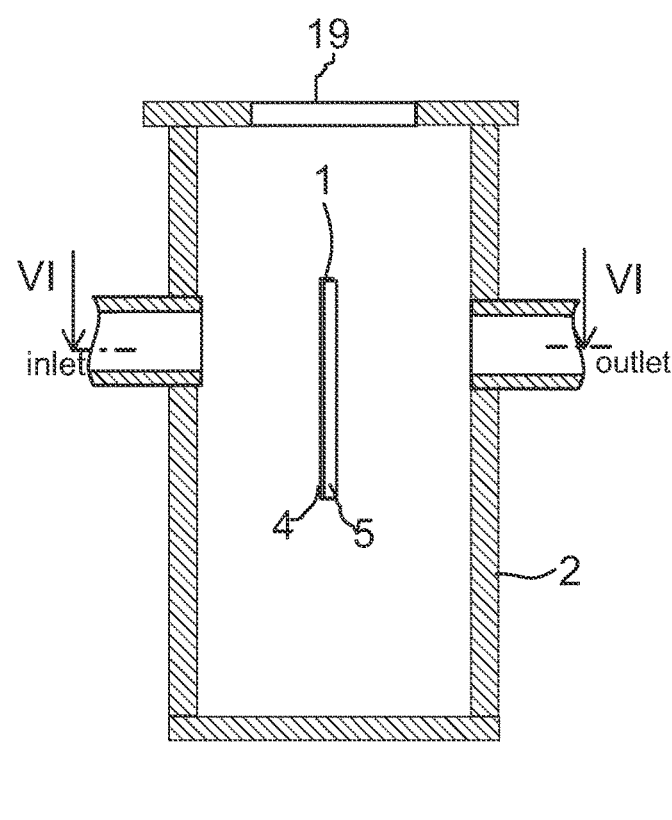
FIG. 5 shows a cross-section V-V from FIG. 4.

FIGS. 1, 4 and 5 show a stormwater drain baffle 1 which is disposed in a flow-through stormwater sump 2. In the sump 2 the baffle 1 baffles a stormwater flow-path. The baffle has a plurality of openings 3 distributed over the area of the baffle 1. The baffle 1 comprises two substantially planar and rectangular baffle portions 4, 5 connected to each other. The baffle portions 4, 5 are disposed near to and in superposed relation to each other, so that the baffle 1 portions overlap each other and are adjustably connected to each other for adjusting the width $W_{tot}$ of the baffle 1. The baffle portions 4, 5, comprise fixing members 7, 8 which are monolithic with the baffle portion 4, 5 and adapted for fixing the baffle 1 to the inner sidewall of the sump or the chamber.

Figure 2:
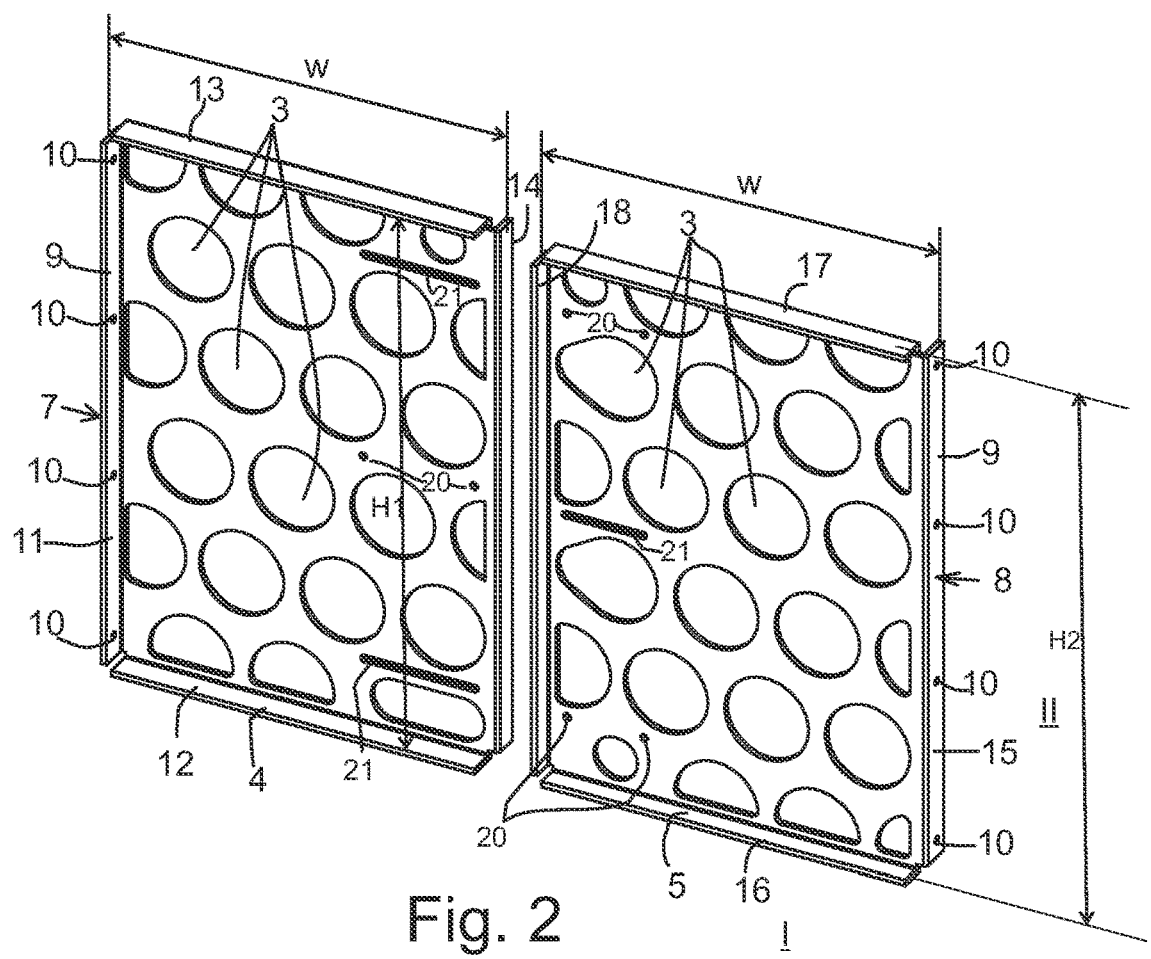
FIG. 2 shows the baffle portions of the baffle of FIG. 1 as separated.

With reference to FIGS. 1, 2 and 4, the fixing members 7, 8 comprise fixing flanges 9 having bolt holes 10 to enable forming first bolted joints A by which the baffle portions can be attached to the sidewall of the sump.

As can be seen in FIGS. 1 and 2, the baffle portions 4, 5 comprise stiffening members 11, 12, 13, 14; 15, 16, 17, 18 disposed at the edges of the rectangular baffle portions 4, 5. In the shown embodiments the stiffening members 11, 12, 13, 14; 15, 16, 17, 18 are disposed at all four edges of each rectangular baffle portions 4, 5. However, some other embodiments may have stiffening members in a less number of edges. Preferably, the stiffening members 11, 12, 13, 14; 15, 16, 17, 18 are stiffening flanges which are monolithic with the baffle portions 4, 5. The stiffening flanges 11, 12, 13, 14; 15, 16, 17, 18 may be bent at right angle in relation to the plane of the baffle portion 4, 5. The fixing flanges 9 of the baffle portions 4, 5 also act as stiffening flanges 11, 15.

Referring to FIGS. 2 and 4, the baffle portion 4, 5 has a width w which is smaller than the diameter D of the manhole 19 of the stormwater sump 2 into which the baffle 1 is to be installed. For example, the width w of the baffle portion 4, 5, 6 is preferably somewhat smaller than 600 mm, if the diameter D of the manhole 19 is 600 mm.

In the embodiments shown in FIGS. 1-7 the number of baffle portions is two. The baffle 1 comprises a rectangular first baffle portion 4 and a rectangular second baffle portion 5.

Figure 8:
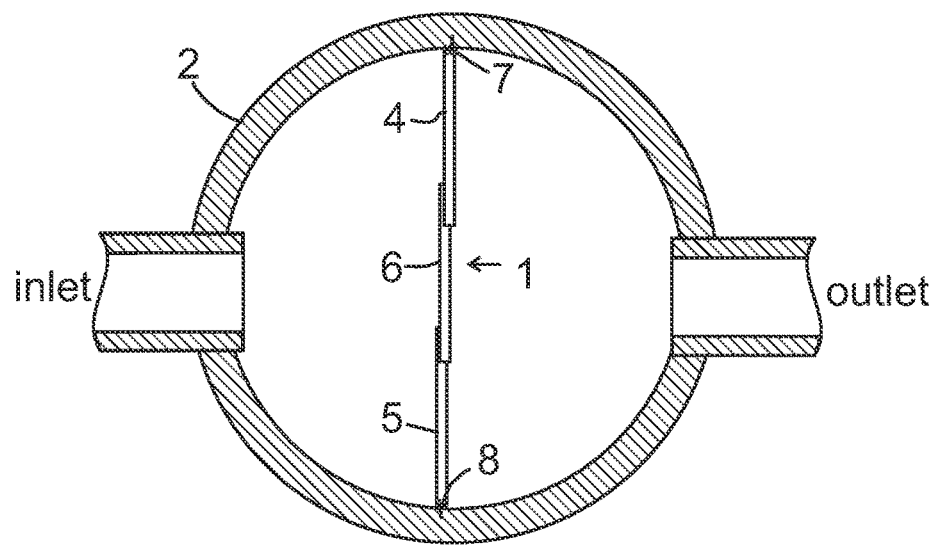
FIG. 8 is a cross-section of a sump corresponding to FIG. 7 wherein the sump has a still greater diameter and the width of the baffle being adjusted accordingly.

FIG. 8 shows an embodiment of the baffle 1 which has three overlapping baffle portions 4, 5, 6 to span between the opposite sidewall parts of a large diameter sump 2.

Referring to FIG. 2, the first baffle portion 4 and the second baffle portion 5 have a first side I and a second side II, and the second side is the opposite side in relation to the first side. In the following description the terms "vertical", "horizontal", "upper" and "lower" should be understood in reference to the orientation of the implementations shown in the drawings. The vertical fixing flange 9 of the first baffle portion 4 is directed towards the first side I and the vertical fixing flange 9 of the second baffle portion 5 is directed to the second side II. The stiffening flange 14 of the first baffle portion 4, which is disposed at the edge that is parallel in relation to the vertical fixing flange 9 of the first baffle portion, is directed to the second side II. The stiffening flange 18 of the second baffle portion 5, which is disposed at the edge that is parallel in relation to the vertical fixing flange 9 of the second baffle portion 5, is directed to the first side I. The stiffening flange 12, which is at the horizontal lower edge of the first baffle portion 4, is directed to the first side I. The stiffening flange 16, which is at the horizontal lower edge of the second baffle portion 5, is directed to the first side I. The stiffening flange 13, which is at the horizontal upper edge of the first baffle portion 4, is directed to the first side I. The stiffening flange 17, which is at the horizontal upper edge of the second baffle portion 5, is directed to the first side I.

The inner distance H1 between the lower and upper stiffening flanges 12 and 13 of the first baffle portion 4 is larger than the outer distance H2 of the lower and upper stiffening flanges 16 and 17 of the second baffle portion 5.

Figure 3:
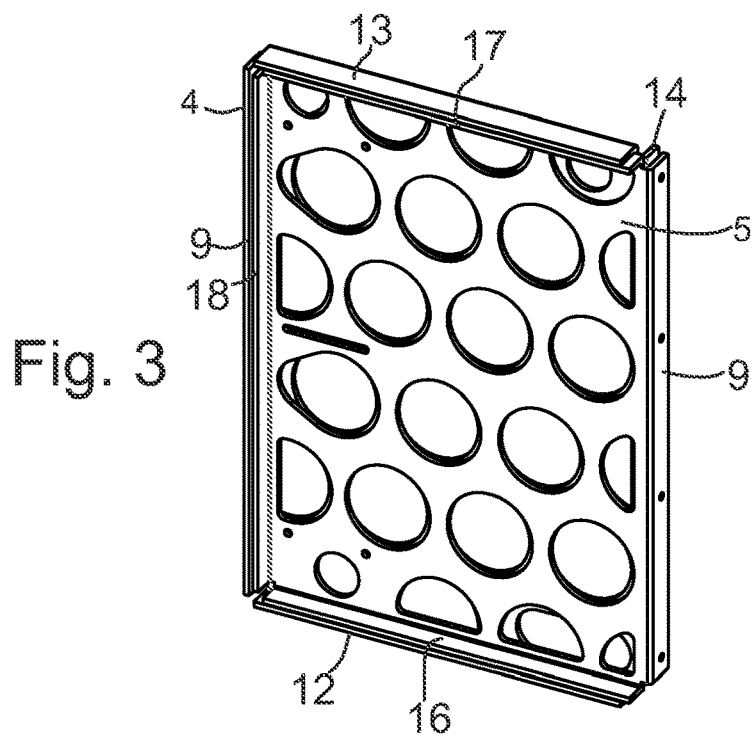
FIG. 3 shows the two baffle portions of FIG. 2 in a stacked position.

Referring to FIG. 3, this dimensioning enables stacking of the baffle portions 4, 5 so that the planar portions having openings 3 are closely in relation to each other to form a compact package suitable for warehousing and delivery.

The stiffening flanges 12 and 16 at the lower edges of the baffle portions 4, 5 also have an ability to restrain the flow of the stormwater in the sump, when in use.

Figure 6:
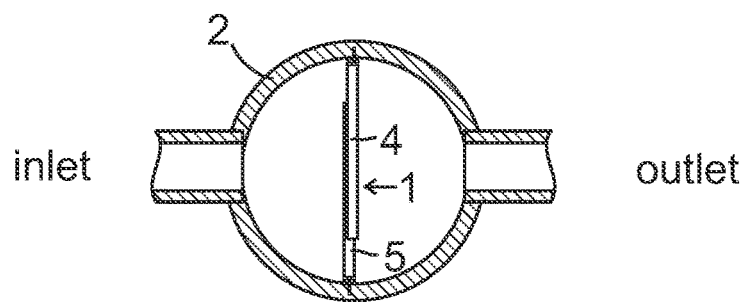
FIG. 6 shows a cross-section VI-VI from FIG. 6.
Figure 7:
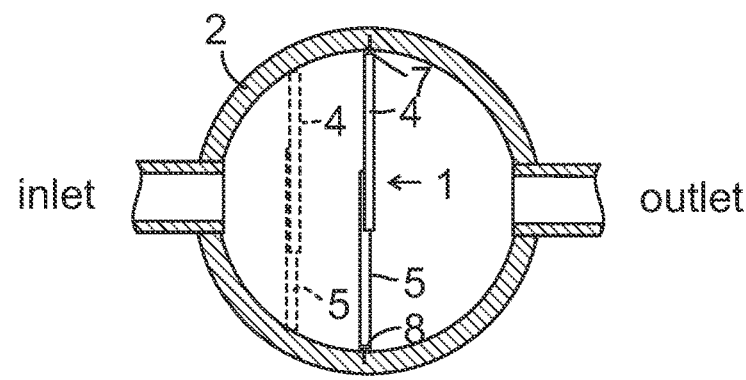
FIG. 7 is a cross-section of a sump corresponding to FIG. 6 wherein the sump has a greater diameter and the width of the baffle being adjusted accordingly.
Figure 9:
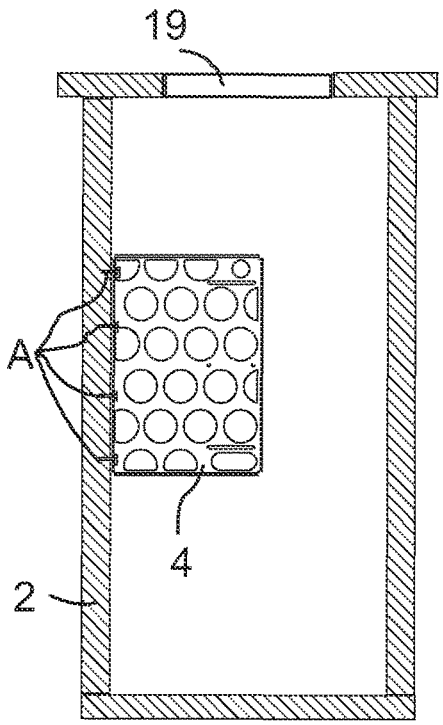
FIGS. 9 and 10 shows steps of installation of the baffle into the sump.
Figure 10:
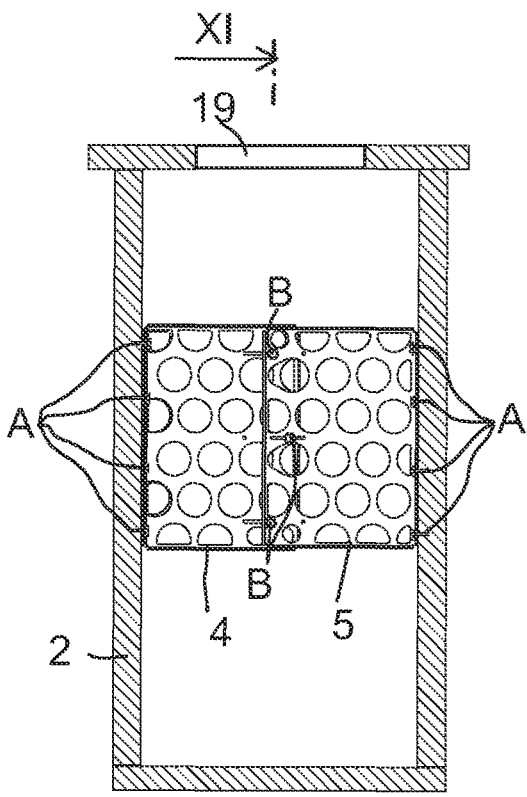
Figure 11:
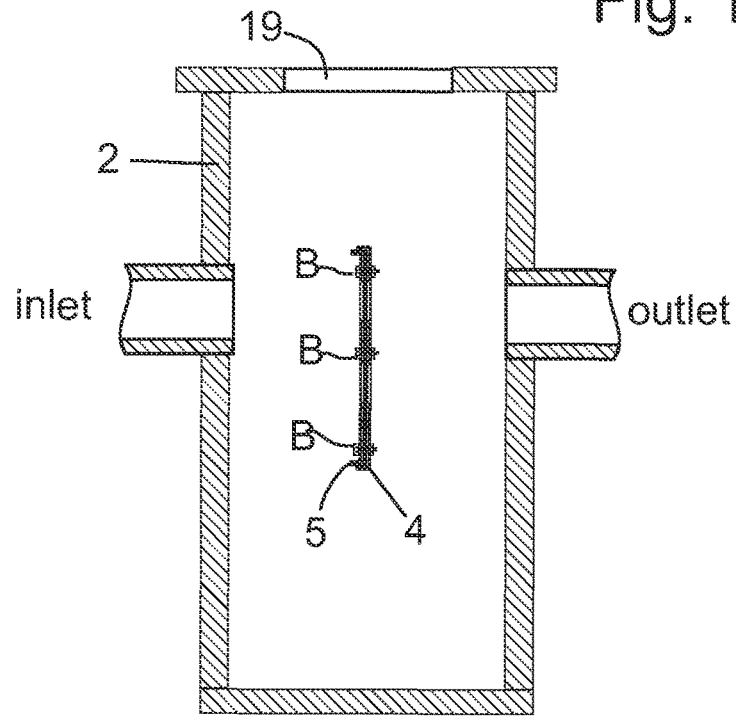
FIG. 11 shows a cross-section XI-XI from FIG. 10.

FIG. 9 shows that for the installation of the baffle in an existing stormwater sump 2 bolt holes are drilled to the sidewall of the sump 2. The first baffle portion 4 is connected by first bolted joints A to the sidewall in vertical orientation at a suitable height from the bottom of the sump and substantially at the center, or offset from the centerline, of the sump, as shown in FIG. 6 or 7. The baffle 1 should be oriented such that a centerline of the inlet conduit intersects a major plane of the baffle at a point above the bottom of the baffle. After the first baffle portion 4 has been installed, the second baffle portion 5 is connected likewise to the opposite sidewall by first bolted joints A. Finally, the first and second baffle portions 4, 5 are connected to each other by second bolted joints B located at the overlapping parts of the baffle portions, as shown in FIGS. 10 and 11. As can also be seen in FIG. 2, the baffle portions 4 and 5 comprise bolt holes 20 and horizontal slots 21 which have been made near to the vertical edges of the baffle portions 4, 5 and which bolt holes 20 and slots 21 are aligned to enable the bolted joints B.

The baffle portions 4, 5 may be made from a variety of materials, such as steel, aluminum or plastics. The shown examples of the baffles 1 are designed to be made of plastics. The wall thickness of the baffle made of plastics is between 5 to 15 mm. The weight of the baffle 1 is less than 5 kg. The light weight of the baffle makes it easy to handle during installation.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A stormwater drain baffle to be disposed in a flow-through stormwater sump or chamber for baffling a stormwater flow-path, the baffle comprising:
    a first baffle portion and a second baffle portion, each of the first baffle portion and the second baffle portion including a plurality of openings;
    the first and second baffle portions configured to be connected to each other, wherein the first and second baffle portions are disposed near to and in superposed relation to each other so that the first and second baffle portions overlap each other and are adjustably connected to each other for adjusting the width ($W_{tot}$) of the baffle;
    wherein the first and second baffle portions of the baffle include a fixing member adapted for fixing the baffle to the inner sidewall of the sump or the chamber; and
    wherein the first baffle portion has a first pair of horizontal stiffening members and the second baffle portion has a second pair of horizontal stiffening members, the distance between the first pair of stiffening members of the first baffle portion having a first dimension and the distance between the second pair of stiffening members of the second baffle portion having a second dimension, the first dimension being less than the second dimension.

2. The baffle according to claim 1, wherein the fixing member includes a fixing flange having at least one bolt hole for a first bolted joint (A).

3. The baffle according to claim 2, wherein the first and second pairs of stiffening members are stiffening flanges which are monolithic with the baffle portion.

4. The baffle according to claim 3, wherein the fixing flange is an additional stiffening flange.

5. The baffle according to claim 3, wherein the first baffle portion is rectangular and the second baffle portion is rectangular.

6. The baffle according to claim 5, wherein the first baffle portion and the second baffle portion have a first side (I) and a second side (II), and the second side is the opposite side in relation to the first side and wherein the vertical fixing flange of the first baffle portion is directed towards the first side (I) and the vertical fixing flange of the second baffle portion is directed to the second side (II).

7. The baffle according to claim 5, wherein the first baffle portion and the second baffle portion have a first side (I) and a second side (II), and the second side is the opposite side in relation to the first side and wherein an additional stiffening flange of the first baffle portion, which is disposed at the edge that is parallel in relation to the vertical fixing flange of the first baffle portion, is directed to the second side (II).

8. The baffle according to claim 5, wherein the first baffle portion and the second baffle portion have a first side (I) and a second side (II), and the second side is the opposite side in relation to the first side and wherein an additional stiffening flange of the second baffle portion, which is disposed at the edge that is parallel in relation to the vertical fixing flange of the second baffle portion, is directed to the first side (I).

9. The baffle according to claim 5, wherein the first baffle portion and the second baffle portion have a first side (I) and a second side (II), and the second side is the opposite side in relation to the first side and wherein the stiffening flange, which is at the horizontal lower edge of the first baffle portion, is directed to the first side (I).

10. The baffle according to claim 5, wherein the first baffle portion and the second baffle portion have a first side (I) and a second side (II), and the second side is the opposite side in relation to the first side and wherein the stiffening flange, which is at the horizontal lower edge of the second baffle portion, is directed to the first side (I).

11. The baffle according to claim 5, wherein the first baffle portion and the second baffle portion have a first side (I) and a second side (II), and the second side is the opposite side in relation to the first side and wherein the stiffening flange, which is at the horizontal upper edge of the first baffle portion, is directed to the first side (I).

12. The baffle according to claim 5, wherein the first baffle portion and the second baffle portion have a first side (I) and a second side (II), and the second side is the opposite side in relation to the first side and wherein the stiffening flange, which is at the horizontal upper edge of the second baffle portion, is directed to the first side (I).

13. The baffle according to claim 1, wherein each of the first and second baffle portions are substantially planar.

14. The baffle according to claim 13, wherein the first and second pairs of stiffening members are stiffening flanges which are bent at an angle in relation to the plane of the baffle portion.

15. The baffle according to claim 14, wherein the stiffening flanges are bent at a right angle in relation to the plane of each of the first and second baffle portions.

16. The baffle according to claim 13, wherein each of the first and second baffle portions have a width (w) which is smaller than the diameter (D) of the manhole of the stormwater sump into which the baffle is to be installed.

17. The baffle according to claim 16, wherein the width (w) of each of the first and second baffle portions is smaller than 600 mm.

18. The baffle according to claim 1, wherein each of the first and second baffle portions comprises edges, and wherein the first and second pair of stiffening members are disposed at the edges.

19. The baffle according to claim 1, wherein each of the first and second baffle portions are rectangular in shape.

20. The baffle according to claim 19, wherein the first and second pairs of stiffening members are disposed at least at two edges of the first and second baffle portions.

21. The baffle according to claim 20, wherein the first and second baffle portions include stiffening members disposed at four edges of the first and second baffle portions.

22. The baffle according to claim 1, wherein the first and second baffle portions are connected to each other by second bolted joints (B).

23. The baffle according to claim 1, wherein the first and second baffle portions are made of plastics.

24. The baffle according to claim 23, wherein the first and second baffle portions have a wall thickness of 5 to 15 mm.

25. The baffle according to claim 1, wherein the fixing member of the first and second baffle portions are monolithic with the respective first and second baffle portion.

* * * * *